United States Patent
Bench et al.

(10) Patent No.: US 12,169,110 B2
(45) Date of Patent: Dec. 17, 2024

(54) QUICK ATTACH AND DETACH MOUNT FOR FIREARMS AND OTHER OBJECTS

(71) Applicant: Sellmark Corporation, Mansfield, TX (US)

(72) Inventors: Cody Bench, Irving, TX (US); Andrew Pischke, Mansfield, TX (US); Seth D. Fritz, Italy, TX (US)

(*) Notice: Subject to any disclaimer, the term of this patent is extended or adjusted under 35 U.S.C. 154(b) by 10 days.

(21) Appl. No.: 18/115,320

(22) Filed: Feb. 28, 2023

(65) Prior Publication Data

US 2024/0288244 A1    Aug. 29, 2024

(51) Int. Cl.
*F41C 27/00*    (2006.01)
*F16M 11/04*    (2006.01)
*F41A 23/12*    (2006.01)

(52) U.S. Cl.
CPC ........... *F41A 23/12* (2013.01); *F16M 11/041* (2013.01)

(58) Field of Classification Search
CPC .............................. F41A 23/12; F16M 11/041
See application file for complete search history.

(56) References Cited

U.S. PATENT DOCUMENTS

| | | |
|---|---|---|
| 6,637,904 B2 | 10/2003 | Hernandez |
| 7,409,153 B2 | 8/2008 | Ramadan |
| 7,571,563 B2 | 8/2009 | Peterson |
| 7,798,049 B2 | 9/2010 | Willis, Jr. |
| 8,104,213 B2 | 1/2012 | Keng et al. |
| 8,464,628 B2 | 6/2013 | Potterfield et al. |
| 8,857,097 B2 * | 10/2014 | Rorick ................. F41C 27/00 42/114 |
| 8,894,024 B2 | 11/2014 | Deros |
| 9,568,281 B1 * | 2/2017 | Chen ................. F41A 23/10 |
| 2007/0079541 A1 | 4/2007 | Peterson |
| 2010/0307046 A1 | 12/2010 | Cheng |
| 2012/0210624 A1 * | 8/2012 | Schneider ........... F41G 1/387 42/90 |

(Continued)

FOREIGN PATENT DOCUMENTS

JP    2006518156 A    8/2006

OTHER PUBLICATIONS beltfeds.com et al., "M60 Machine Gun Mount—A Closer Look," May 4, 2015, https://www.youtube.com/watch?v=T-j9p3SQ1cE (accessed Jul. 10, 2024).

(Continued)

*Primary Examiner* — Amy J. Sterling
(74) *Attorney, Agent, or Firm* — Mark D. Perdue (57) ABSTRACT

An apparatus for coupling an object to a support has an object member that includes an upper surface configured for attachment to a portion of the object, a lower extent including a generally conical object portion depending from the object member; and a notch formed in a portion of the lower extent. A support member includes a lower surface configured for attachment to the support, an upper surface, and a receptacle formed in the upper surface to receive the lower extent of the object member. The receptacle includes a generally conical support portion to receive and mate with the generally conical object portion. A latch member is selectively operable to engage the notch of the object portion to selectively secure together the object and support members.

11 Claims, 6 Drawing Sheets

(56) References Cited

U.S. PATENT DOCUMENTS

| | | | |
|---|---|---|---|
| 2013/0312307 A1* | 11/2013 | Rorick | F41G 11/003 |
| | | | 42/90 |
| 2017/0153084 A1 | 6/2017 | Tarazi | |
| 2019/0120423 A1 | 4/2019 | Couch, III | |
| 2019/0137208 A1 | 5/2019 | Messinger | |
| 2022/0325974 A1 | 10/2022 | Azhocar | |
| 2023/0243614 A1* | 8/2023 | Landis | F41A 23/08 |
| | | | 42/94 |

OTHER PUBLICATIONS

European Patent Office, Extended European Search Report, Jul. 29, 2024.
STS, "Mk 97 M240 Machine Gun Mount," Mar. 2, 2020, https://www.youtube.com/watch?v=HgJWBkA5JV0 (accessed Jul. 10, 2024).

* cited by examiner

QUICK ATTACH AND DETACH MOUNT FOR FIREARMS AND OTHER OBJECTS

BACKGROUND OF THE INVENTION

1. Field of the Invention

The invention relates to mounts and similar coupling devices and apparatus for attaching firearms and other objects to supports such as tripods. More particularly, the present invention relates to such apparatus having quick-attach and quick-detach features.

2. Summary of the Prior Art

In some cases, it is desirable to mount a firearm or other object on a support structure. The support structure may comprise a tripod, bipod, monopod, or other arrangement that supports the weight of the object in whole or in part while often including the ability to change the orientation of the object. In addition to firearms, the objects mounted on support structures may include telescopes, spotting scopes, binoculars, cameras, rangefinders and similar instruments, as well as other objects.

The assembled object and support structure tend to be large and unwieldy, particularly for transportation or storage. Accordingly, the support structures often are designed to be "collapsible," with telescoping or folding legs and the like, or to be quickly and easily disassembled and reassembled.

However, the object itself is typically coupled or secured to the support structure using threaded fasteners that are strong and capable of rigidly coupling the object to the support, but tend not to be adapted for quick assembly and disassembly. These couplings or mounts may also be inconvenient in the event it is desirable to change the object, for example from an optical device to a firearm. Use of tools or manipulation of thumbwheels and other mechanisms can be particularly unwieldy when a large and heavy object, such as a firearm, is supported by the support structure. Particularly for hunting and similar "field" pursuits, the ability to disassemble the object from the support quickly and to disassemble or collapse the support itself, and to quickly reassemble and deploy them, may be highly desirable features.

U.S. Pat. No. 7,571,563, Aug. 11, 2009, discloses a mounting for a firearm on a support structure in the form of a bipod or monopod in which a grooved "male" part associated with the firearm is received in a "female" part containing ball detents and associated with the support structure. The disclosed coupling, and the remainder of the disclosed device are not rigid.

A need exists, therefore, for mounts or couplings for releasably securing a firearm or other object securely and rigidly to a support structure while also permitting the rapid disassembly of the object from the support structure.

SUMMARY OF THE INVENTION

It is a general object of the present invention to provide an improved mount for attaching and detaching an object, such as a firearm or optical device, to a support or support structure such as a tripod, bipod, monopod or the like.

This and other objects of the present invention are achieved by providing an apparatus comprising an object member that includes an upper surface configured for attachment to a portion of the object, a lower extent including a generally conical object portion depending from the object member; and a notch formed in a portion of the lower extent. A support member includes a lower surface configured for attachment to the support, an upper surface, and a receptacle formed in the upper surface to receive the lower extent of the object member. The receptacle includes a generally conical support portion to receive and mate with the generally conical object portion. A latch member is selectively operable to engage the notch of the object portion to selectively secure together the object and support members.

According to one embodiment of the invention, the generally conical object portion further comprises a plurality of surfaces converging toward an object apex, the apex extending toward a forward end of the object member, and the generally conical support portion of the receptacle further comprises at least one surface converging toward a support apex, wherein, upon assembling together the object and support members, the converging surfaces of the generally conical object and support portions of the object and support members mate together.

According to another embodiment of the present invention, there is a bulge in a forward surface of the generally conical portion of the receptacle proximal the support apex, and also a curved forward surface on the generally conical portion of the object member, wherein, upon assembly of the object and support members, the bulge engages the curved forward surface.

According to yet another embodiment of the present invention, the object is a firearm, and the support is a tripod.

Other objects, features, and advantages of the invention will become apparent to those skilled in the art from the Figures and the Detailed Description of the Invention, which follows.

DETAILED DESCRIPTION OF THE INVENTION

Figure 1:
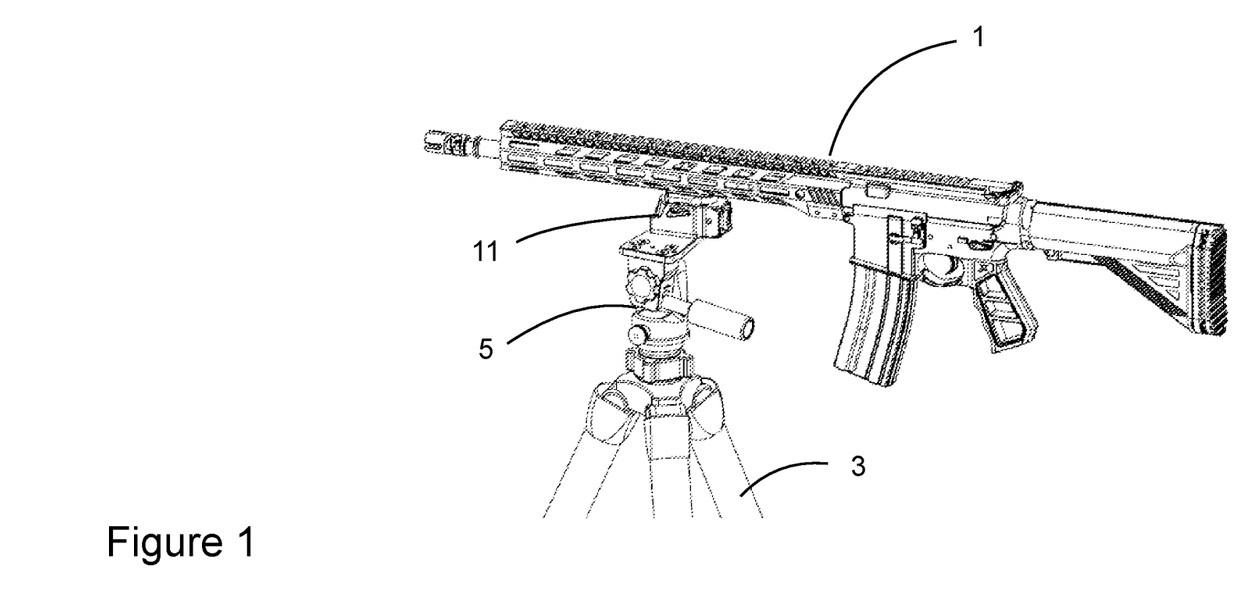
FIG. 1 is a partial perspective view of an object mounted on a support structure, including a mount according to the present invention.

Turning now to the Figures, and particularly to FIG. 1, an object or firearm 1 in the form of a rifle is depicted mounted or secured to a support structure 3 in the form of a tripod. Tripod is illustrated with an optional "tilt and pan" assembly 5, which permits orientation of firearm 1 relative to tripod 3 and to the user of the devices. A mount 11 in accordance with the teachings of the present invention may be disposed between firearm 1 and the tilt and pan portion 5 of tripod 3. The illustration of a firearm and tripod, as object and support, respectively, are exemplary only. The present invention has equal utility in mounting other, non-firearm objects, such as optical devices, to other types of support structures, such as monopods, bipods and the like that are capable of at least partially supporting and orienting an object such as a firearm or optical or other device.

Figure 2:
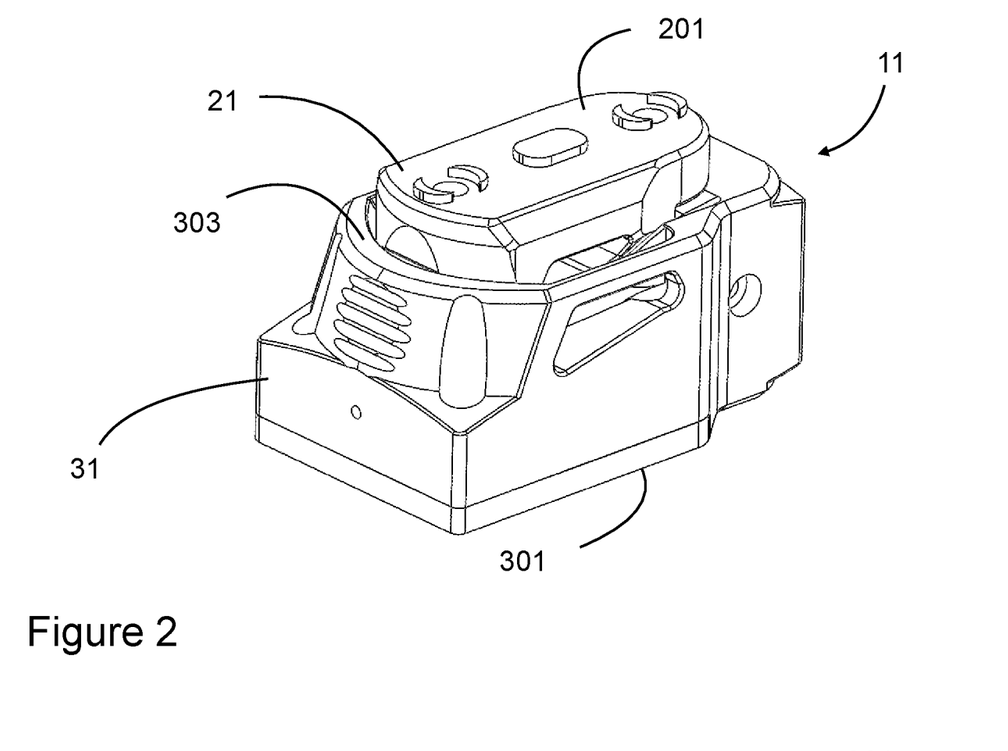
FIG. 2 is a perspective view of the mount according to the present invention assembled together.

FIG. 2 illustrates mount 11 according to one embodiment of the present invention. Mount 11 may have two basic components, an object member 21 and a support member 31, that may be assembled together as shown and as described in greater detail below. Object member 21 may have an upper surface 201 configured or adapted to be attached or secured to firearm 1 or other object by screws or other fasteners, or MIL-STD-1913 or STANAG 2324 "Picatinny" rails, or other conventional arrangements. Support member 31 may have a mounting plate that defines a lower surface 301 configured or adapted to be attached or secured to a support structure (the tilt-and-pan assembly 5 of tripod 3 in FIG. 1) by screws or other fasteners or other conventional arrangements (see FIGS. 6 and 7). As described in greater detail below, object member 21 and support member 31, attached to their respective object and support structure, may be coupled together quickly and positively, thereby securely and rigidly coupling and securing the object to the support structure (firearm 1 to tripod 3 in the example of FIG. 1).

Figure 3:
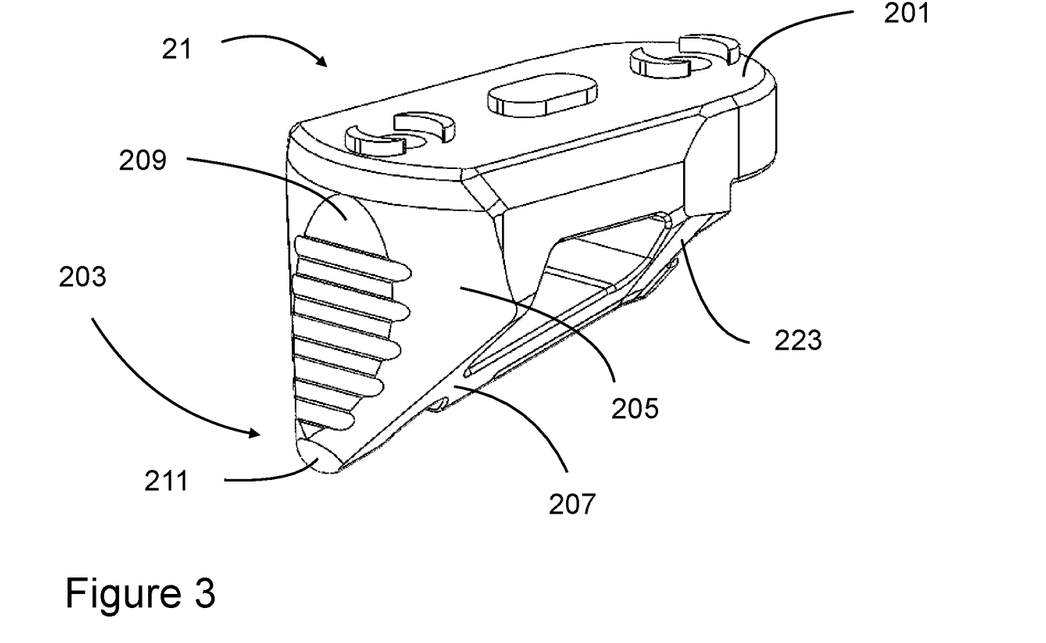
FIGS. 3 and 4 are front perspective and right-side elevation views, respectively, of the object member of the mount of FIGS. 1 and 2.
Figure 4:
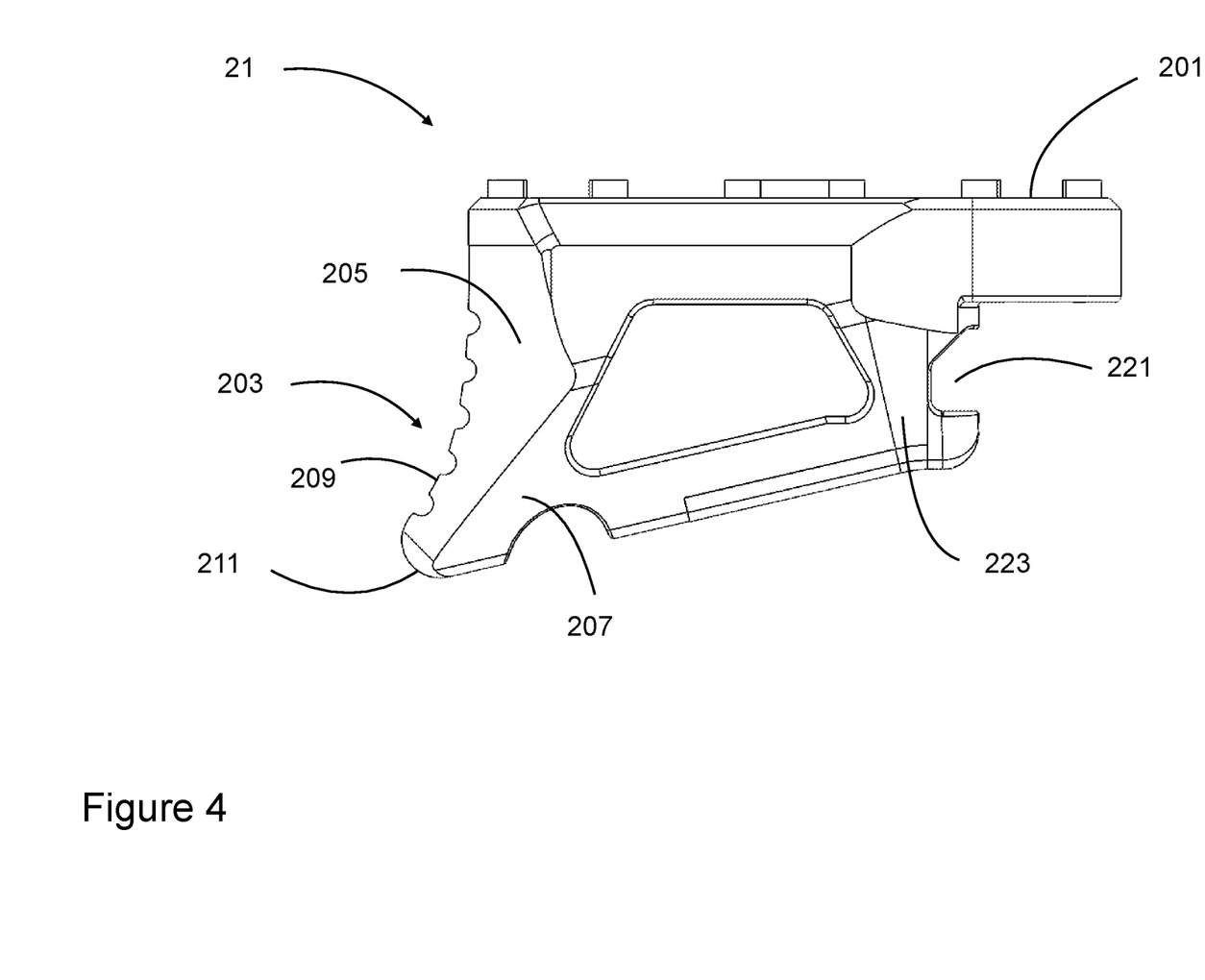

FIGS. 3 and 4 depict object member 21 separated from support member 31. A generally conical portion 203 may depend or extend from a lower extent of object member below upper surface 21. In the illustrative embodiment, generally conical portion 203 is not truly conical in the sense of having a circular cross-section, but may comprise a plurality of surfaces, including a truly conical (circular) forward surfaces 205 and flat or planar lower surfaces 207 (object member 21 is symmetrical in the sense that similar or identical surfaces are present on the reverse that is obscured from view), and a curved front surface 209 formed in conical forward surface 205, that all converge to an object apex 211 oriented slightly downwardly and toward the front of object member 21. Thus, although not truly conical, this plurality of surfaces forms a "generally conical" structure in which at least one surface converges or tapers toward an apex. The structure may also be truly conical or partially conical within the definition of "generally conical."

Figure 5:
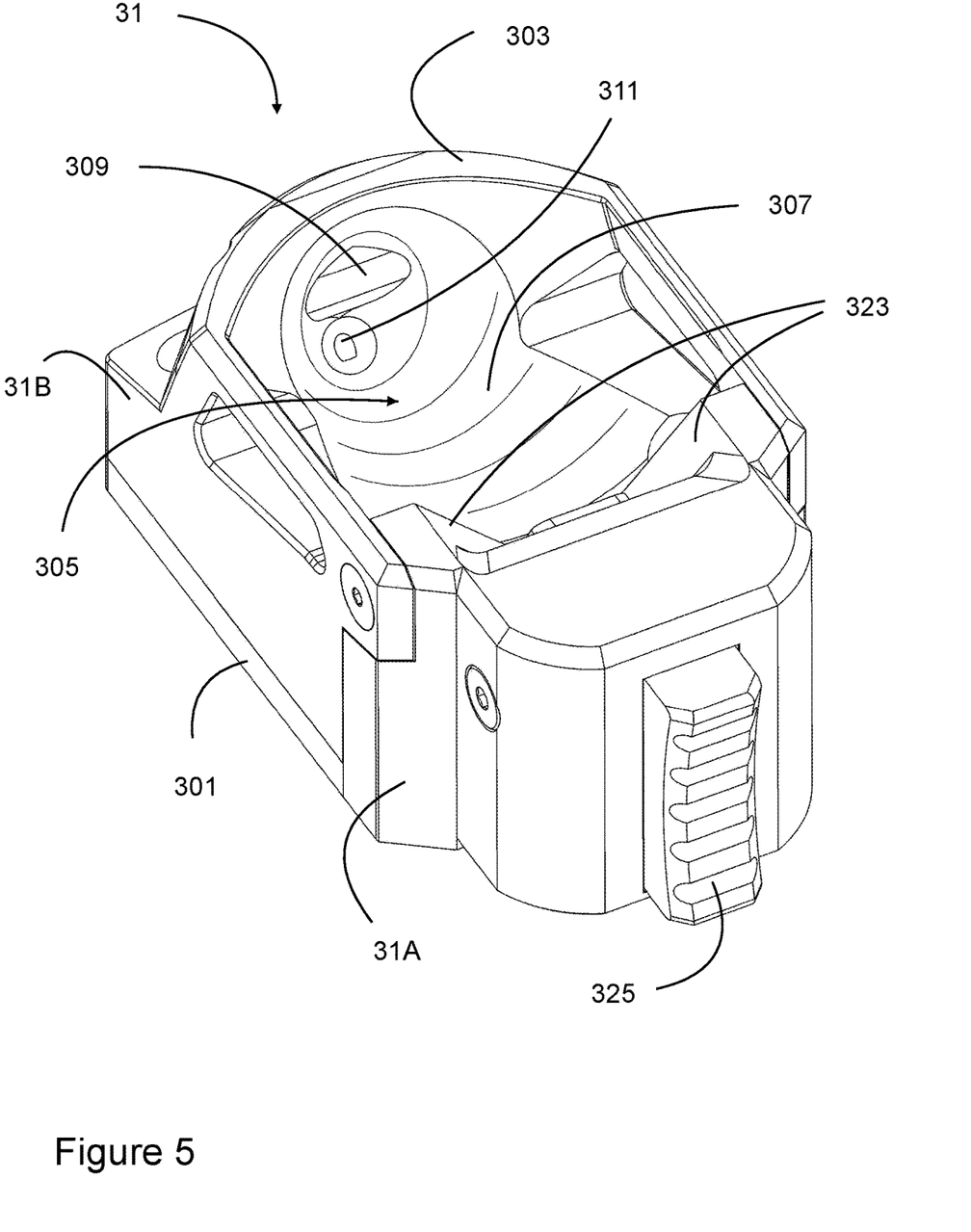
FIGS. 5 and 6 are rear perspective and longitudinal section views, respectively, of the support member of the mount of FIGS. 1 and 2.
Figure 6:
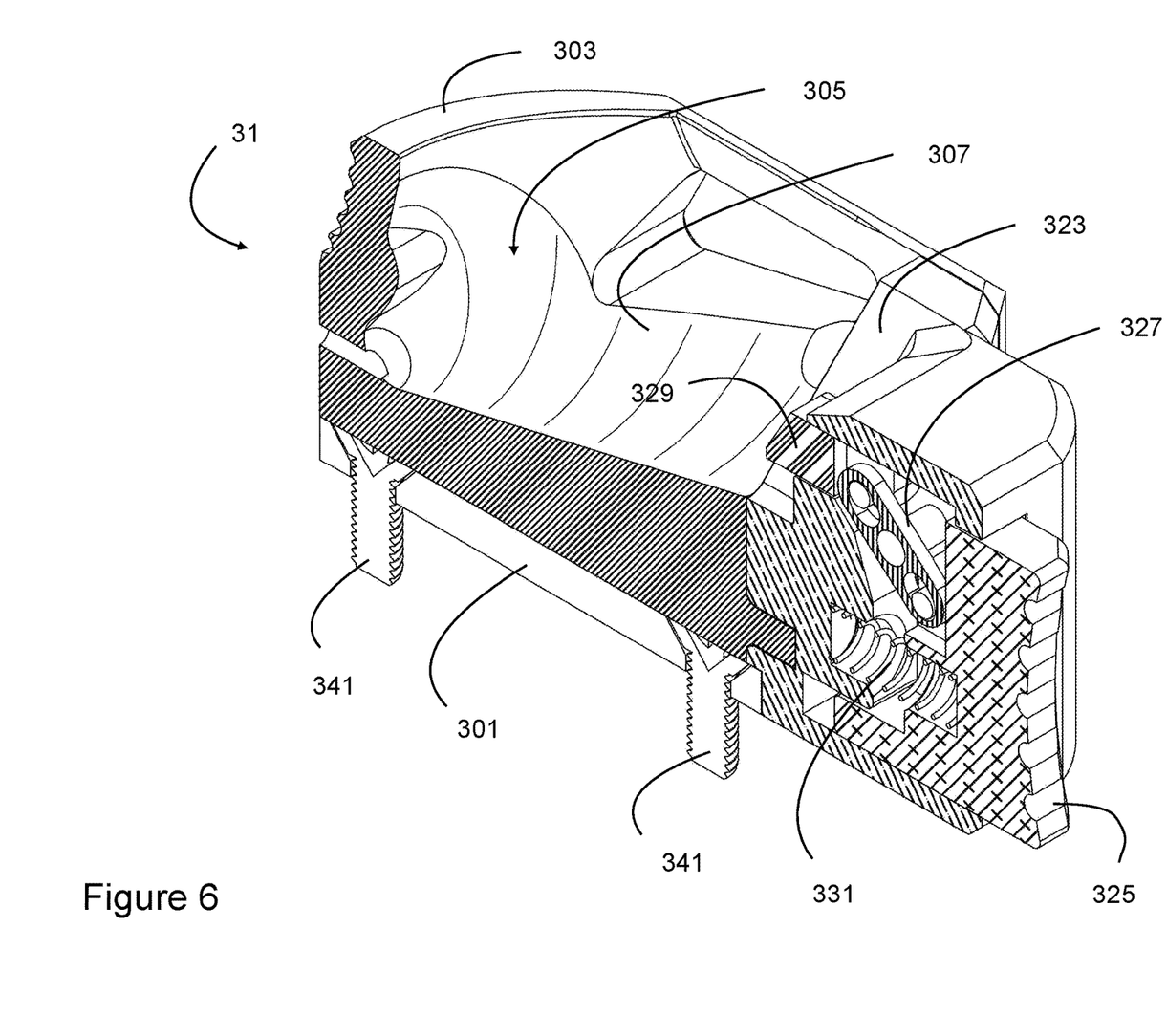

Toward the rear of the lower extent of object member 21, a pair of converging flat surfaces 223 may define a v-shape (again, the rear, mating portion of support member 21 is similar or identical, see FIGS. 5 and 6). A notch 221 (FIG. 4) may be provided in the rear of the lower extent of object member 21. Use of the terms "forward," "front," and "rear" is arbitrary for the purposes of describing locations in the drawings and the direction and orientation of such locations may be reversed or otherwise altered while remaining within the scope of the invention.

FIGS. 5 and 6 illustrate support member 31 in greater detail. As illustrated, support member 31 may be formed of two parts 31A and 31B, secured together by screws or other appropriate fasteners. At the lower extent of support member 31, an adapter plate 301 may form a portion of its lower surface and may be secured to portion 31B by screw or other fasteners. Below upper surface 303, a generally conical receptacle 305 may be formed. Unlike generally conical portion 203 of object member 21, conical receptacle 305 is truly conical (although only a partial cone), having a single circular surface 305 that tapers or converges toward a support apex 31. Like conical portion 203, receptacle need only be "generally conical" and may instead comprise a plurality of flat or curved surfaces converging or tapering toward an apex. A bulge or projection 309 may be provided in a forward portion of receptacle 305 to mate with front curved surface 209 of generally conical portion 203 of object member 21, as illustrated and described below in connection with FIG. 7.

Figure 7:
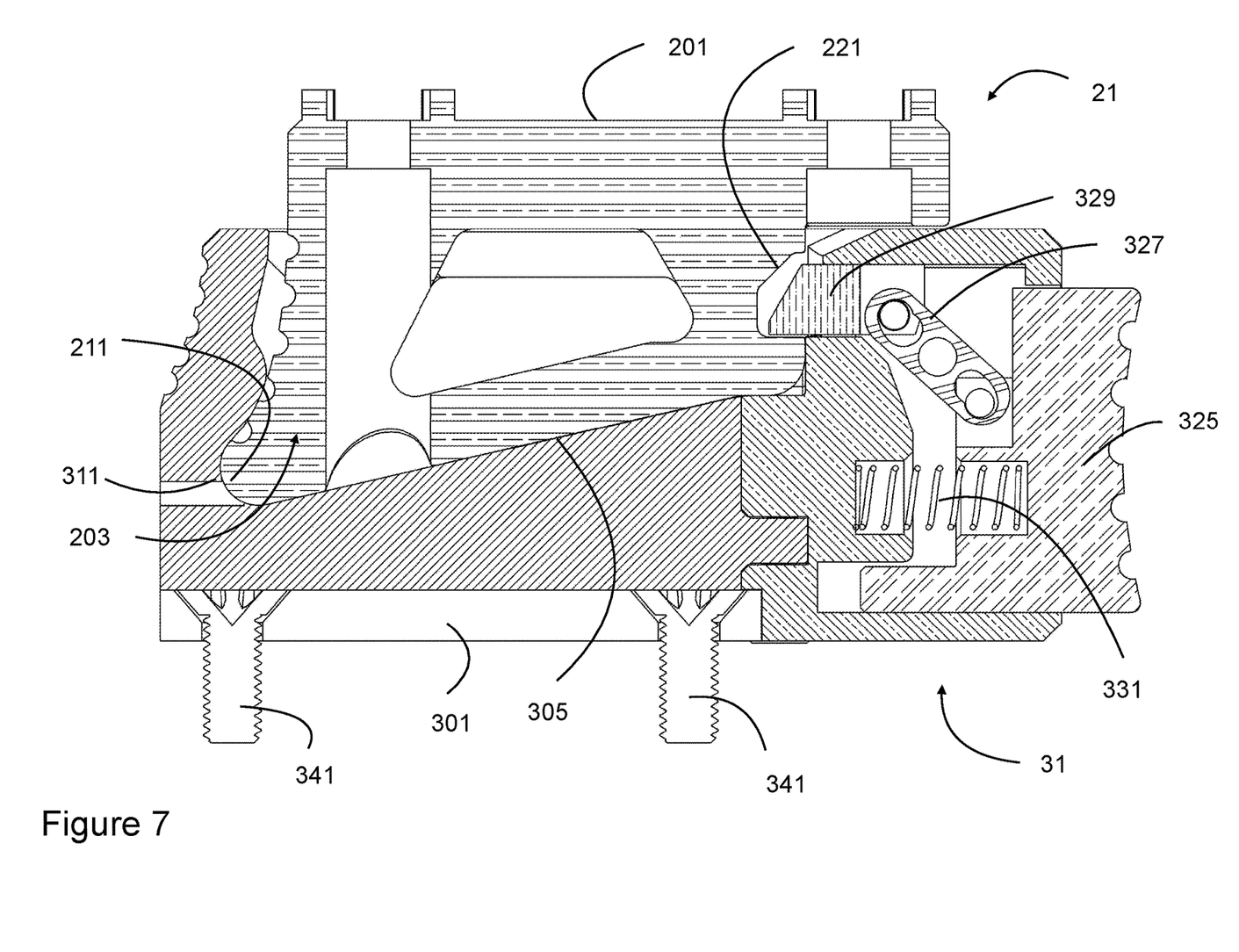
FIG. 7 is a longitudinal section view of the mount of FIGS. 1 and 2 showing the object and support members assembled together.

Toward the rear of receptacle 305, a pair of generally flat surfaces 323 converge to define a v-shaped recess that mates with the v-shape of surfaces 223 of object member 21 upon assembly together. A latch assembly including a latch button 325 may be provided at the rear of support member 31. As shown in FIG. 6, button 325 acts on pivoting lever 327, which in turn acts on latch member 329 to retract and extend latch member 329 into engagement with latch receptacle or notch 221 in the rear of object member 21. Biasing member or coil spring 331 may be employed to bias latch member 329 forward into a forward, latched position and to maintain latch button biased rearwardly until actuated. Latch member 329 thus "automatically" (without user actuation) engages with notch 221 upon mating together of object 21 and support 31 members. As shown in FIGS. 6 and 7, both latch receptacle or notch 221 and the remaining elements of latch assembly 325, 327, 329, and 331 are arranged generally opposite the apices of the conical portions 211, 311 of object or support members 21, 31, respectively. A pair of screws or other fasteners 341 may extend through adapter plate 301 into engagement with threaded apertures in support 3 (tilt and pan assembly 5 in FIG. 1)

FIG. 7 depicts, in section view, object and support members 21, 31 assembled together. Generally conical portion 203 of object member 21 may be received in generally conical receptacle 305 of support member 31. The generally conical shapes may align and register object and support members 21, 31 together, and v-shaped surfaces 223 and 323 also mate and register when object and support apexes 211, 311 are registered together at the maximum forward and downward travel of conical portion 203 within conical receptacle 305. Latch member 329 may "automatically" engage with notch 221 to retain members 21, 31 together and to urge conical portion 203 downwardly into engagement with conical receptacle 305. Bulge 309 in receptacle 305 mates with front curved surface 209 to aid retention of conical portion 203 in receptacle 303.

Object 21 and support 31 members may preferably be cast and/or machined from anodized 6061 aluminum. Lever 327 and latch member 329 may preferably be formed from cast, machined, or forged steel or stainless steel, for additional strength and wear-resistance. Other materials, including polymers, reinforced polymers, and metals may be suitable, as well.

In operation, object member 21 may be secured to an object such as a rifle 1. Support member 31 may be secured to a support structure such as a tripod 3, 5. When It is desired to mount rifle 1 on tripod 3, 5, generally conical portion 203 may be inserted into receptacle 305 and pushed down and forward until latch member 329 engages notch 221, at which time object and support members 21, 31 are securely and rigidly coupled together along with rifle 1 and tripod 3, 5. To disassemble, latch button 325 may be depressed to retract latch member 329 from engagement with notch 221 and object and support members 21, 31 may be disengaged or disassembled by moving rifle 1 and object member 21 upwardly and rearwardly relative to tripod 3, 5 and support member 31.

The mount according to the teachings of the present invention and preferred and exemplary embodiments presents a number of advantages. Primarily, it provides a very easily and quickly attachable and detachable connection between an object and support structure, particularly when the object is heavy and awkwardly shaped. It provides a connection that is rigid, self-aligning and self-centering, and requires no tools and actuation of only a single, easily accessed button to disassemble. The relatively large generally conical portion and receptacle are easily aligned and mated, even when the object is large and heavy or otherwise unwieldy.

The invention has been described with reference to preferred and exemplary embodiments. It is thus susceptible to variation and modification without departing from the scope of the claims, which follow.

We claim:

1. An apparatus for coupling an object to a support, the apparatus comprising:
   an object member including:
      an upper surface configured for attachment to a portion of the object;
      a lower extent including a generally conical object portion tapering to an object apex depending from the object member; and
      a notch formed in the lower extent at an end of the lower extent generally opposite the object apex;
   a support member including:
      a lower surface configured for attachment to the support;
      an upper surface;
      a receptacle formed in the upper surface to receive the lower extent of the object member, the receptacle including a generally conical support portion that tapers to a support apex to receive and mate with the generally conical object portion; and
   a latch carried by the support member generally opposite the support apex and selectively operable to engage the notch of the object portion to selectively secure together the object and support members.

2. The apparatus according to claim 1, wherein:
   the generally conical object portion further comprises a plurality of surfaces converging toward the object apex, the apex extending toward a forward end of the object member; and
   the generally conical support portion of the receptacle further comprises at least one surface converging toward a support apex, wherein, upon assembling together the object and support members, the converging surfaces of the generally conical object and support portions of the object and support members mate together.

3. The apparatus according to claim 2, further comprising:
   a bulge in a forward surface of the generally conical portion of the receptacle proximal the support apex; and
   a curved forward surface on the generally conical portion of the object member, wherein, upon assembly of the object and support members, the bulge engages the curved forward surface.

4. The apparatus according to claim 1, wherein the object is one of a firearm and optical device, and the support is one of a monopod, bipod, and tripod.

5. An apparatus for coupling an object to a support, the apparatus comprising:
   an object member including:
      an upper surface configured for attachment to a portion of the object;
      a lower extent including a generally conical object portion depending from the object member, the generally conical object portion including at least one surface converging to an object apex; and
      a latch receptacle formed in a portion of the lower extent opposite the object apex;
   a support member including:
      a lower surface configured for attachment to the support;
      an upper surface;
      a receptacle formed in the upper surface to receive the lower extent of the object member, the receptacle including a generally conical support portion to receive and mate with the generally conical object portion, the generally conical support portion including at least one surface converging to a support apex; and
   a latch carried by the support member opposite the support apex of the receptacle and selectively operable to engage the latch receptacle of the object portion to selectively secure together the object and support members.

6. The apparatus according to claim 5, further comprising:
   a bulge in a forward surface of the generally conical portion of the receptacle proximal the support apex; and
   a curved forward surface on the generally conical portion of the object member, wherein, upon assembly of the object and support members, the bulge engages the curved forward surface.

7. The apparatus according to claim 5, wherein:
   the rear portion of the lower extent of the object member is v-shaped; and
   the receptacle of the support member includes a correspondingly v-shaped portion to receive the v-shaped rear portion of the lower extent of the object member.

8. The apparatus according to claim 5, wherein the object is one of a firearm and optical device, and the support is one of a monopod, bipod, and tripod.

9. An apparatus for coupling a firearm or optical device to a monopod, bipod, or tripod, the apparatus comprising:
   an upper member having an upper extent configured to be secured to the firearm or optical device;
   a generally conical projection depending downwardly from the upper member, the projection including a plurality of surfaces converging to an upper apex;
   a lower member having a lower extent adapted to be secured to the monopod, bipod, or tripod;
   a generally conical receptacle formed in an upper surface of the lower member, the receptacle including a plurality of surfaces converging to a lower apex, the receptacle configured to receive the generally conical projection and secure the upper and lower members together;
   a latch assembly operable to releaseably secure the generally conical projection in the generally conical receptacle, the latch including a latch receptacle disposed in one of the generally conical projection and generally conical receptacle and a user-operable latch in another of the generally conical projection and generally conical receptacle, wherein the latch selectively engages the latch receptacle.

10. The apparatus according to claim 9, wherein the latch further comprises:
   a latch receptacle formed in the generally conical projection generally opposite the upper apex; and
   a spring-biased button-operated latch member that selectively engages the latch receptacle.

11. The apparatus according to claim 10, wherein the latch receptacle further comprises a notch.

\* \* \* \* \*